Feb. 9, 1937. F. A. HIRSCHMAN ET AL 2,069,831

BRAKE

Filed March 28, 1936 4 Sheets-Sheet 1

INVENTORS
F. A. HIRSCHMAN,
H. J. HIRSCHMAN,
BY Albert J. McCauley
ATTORNEY.

Feb. 9, 1937. F. A. HIRSCHMAN ET AL 2,069,831
BRAKE
Filed March 28, 1936  4 Sheets-Sheet 2
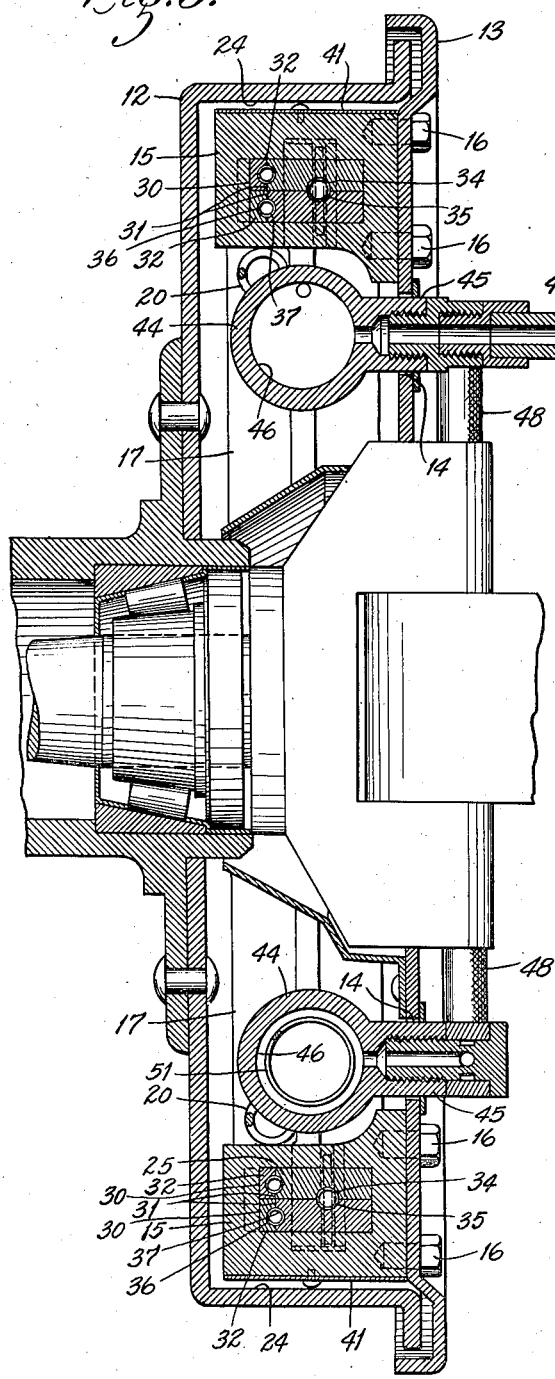
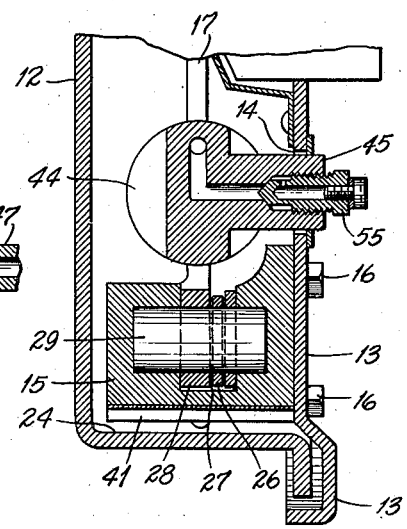
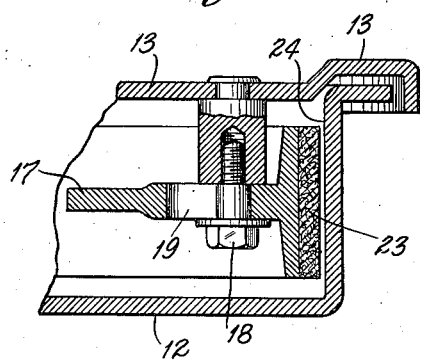
INVENTORS:
F. A. HIRSCHMAN,
H. J. HIRSCHMAN,
By Albert J. McCauley
ATTORNEY.

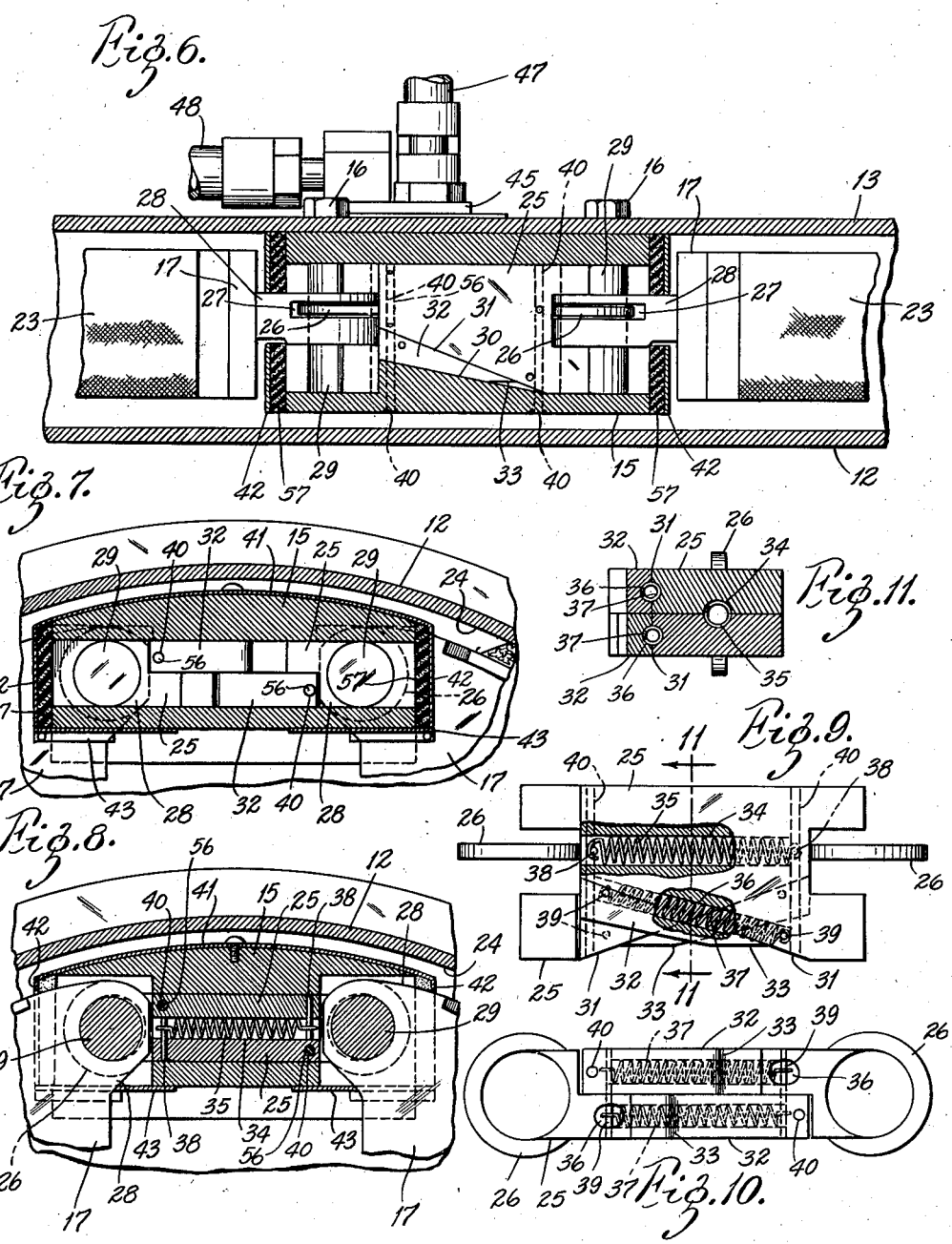

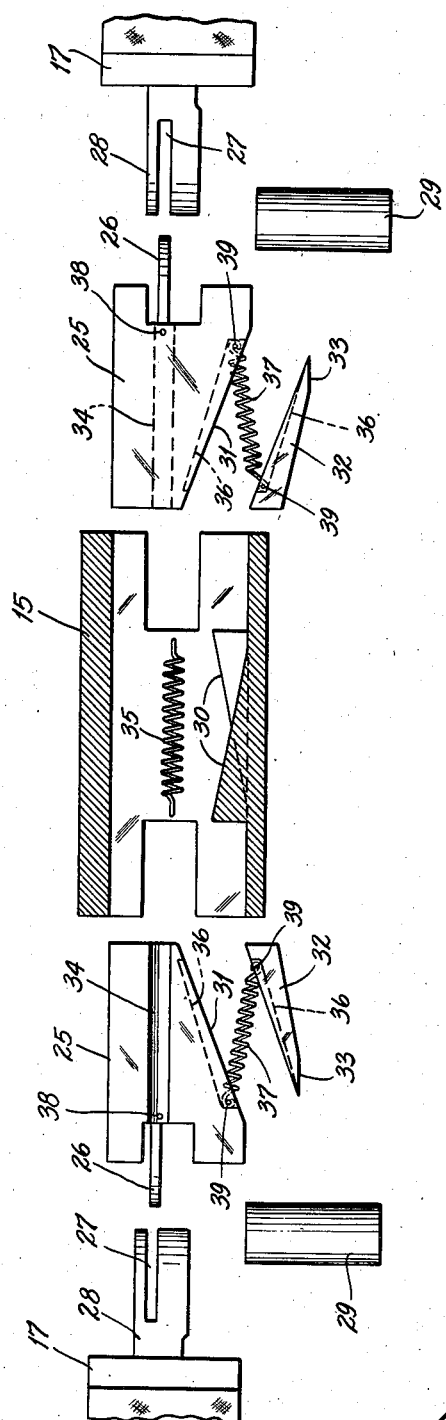

Patented Feb. 9, 1937

2,069,831

UNITED STATES PATENT OFFICE 2,069,831

BRAKE

Frederick A. Hirschman and Harry J. Hirschman, Rock Hill Village, Webster Groves, Mo.

Application March 28, 1936, Serial No. 71,390

17 Claims. (Cl. 188—152)

This invention relates to brakes, and more particularly to hydraulic brakes of the internal expanding type.

In recent years the power and speed of automobiles has been greatly increased, requiring highly efficient and effective brakes to provide safe operating conditions.

A reliable and effective braking system on an automobile should provide equalized braking action on all four wheels, the capability to stop the automobile in a relatively short distance without excessive movement of the brake pedal, and long service requiring no manual brake adjustments for the entire life of the brake lining.

It has been a very difficult problem to produce a brake which has these properties and will maintain the same throughout the life of the brake lining. In so far as we are aware, there has not been a satisfactory and complete solution to this problem prior to our invention.

An object of our invention, therefore, is to produce a braking system which will provide a powerful and equalized braking action on all four wheels of an automobile.

Another object of this invention is to provide a brake wherein the braking thrusts are well distributed over the surfaces of the brake lining.

A further object of this invention is to produce a brake which will automatically adjust itself to the various different operating conditions, so as to eliminate manual adjustments of the brake throughout the life of the brake lining.

A further object is to provide an adjusting device which will automatically compensate for wear of the brake lining and prevent excessive movement of the brake shoes.

A still further object of our invention is to provide a braking system which permits efficient operation of the brakes during the effective life of the brake lining, and then advises the operator when the brakes should be relined.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications within the scope of the claims hereunto appended.

Fig. 3 is a vertical sectional view taken at a right angle to Fig. 2 and approximately on the line 3—3 of Fig. 1.

Fig. 4 is a vertical sectional view taken approximately on the line 4—4 of Fig. 1.

Fig. 5 is a detail section taken approximately on the line 5—5 of Fig. 1.

Fig. 6 is a horizontal section taken approximately on the line 6—6 of Fig. 1.

Fig. 7 is a side elevation of the take-up device with the anchor block and brake drum shown in section.

Fig. 8 is a section through the take-up device with the brake shoes in elevation.

Fig. 9 is a top view of the slide members, detached.

Fig. 10 is a side elevation of said slide members.

Fig. 11 is a detail section taken on the line 11—11 of Fig. 9.

Fig. 12 is an exploded view of the take-up device and portions of the brake shoes.

Briefly described, our brake may include a pair of oppositely disposed lined brake shoes, a brake drum surrounding the brake shoes, operating means for actuating the brake shoes, and an automatic adjusting device which is actuated by movements of the brake shoes to adjust the brake shoes to varying operating conditions, so as to provide efficient and effective braking action at all times.

The automatic adjusting device preferably regulates the position of the brake shoes with respect to the brake drum, and maintains a predetermined clearance between these members during the life of the brake lining. The automatic adjusting device permits normal movements of the brake shoe, but is actuated by undesirable movements of the brake shoes to correct the same.

As an illustration of one form of our invention, we have shown a brake drum 12, such as usually carried by an automobile wheel, and a non-rotatable circular plate 13 for supporting the braking mechanism. However, it is to be understood that our invention is not limited to use with automobile wheels, but may be employed wherever suitable.

Figure 1:
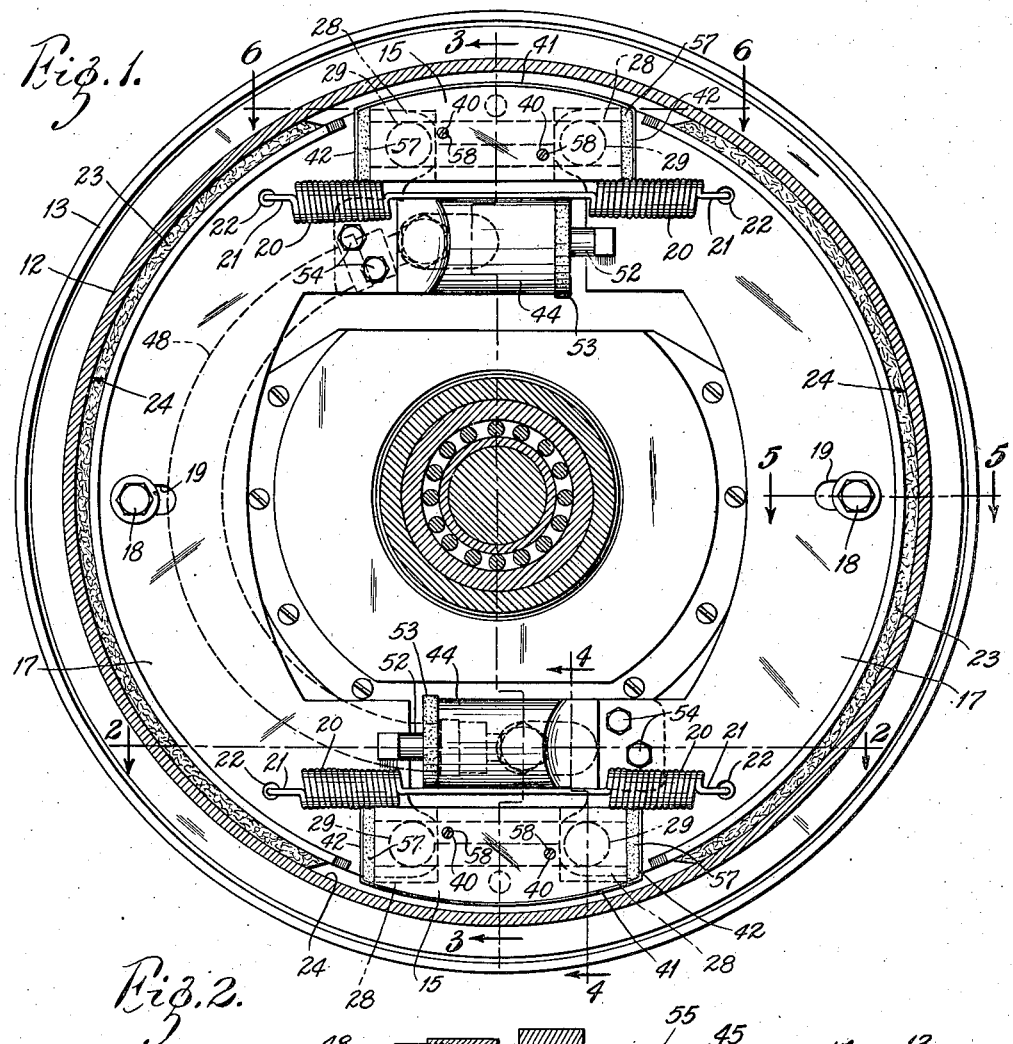
Fig. 1 is a vertical section illustrating our invention.
Figure 2:
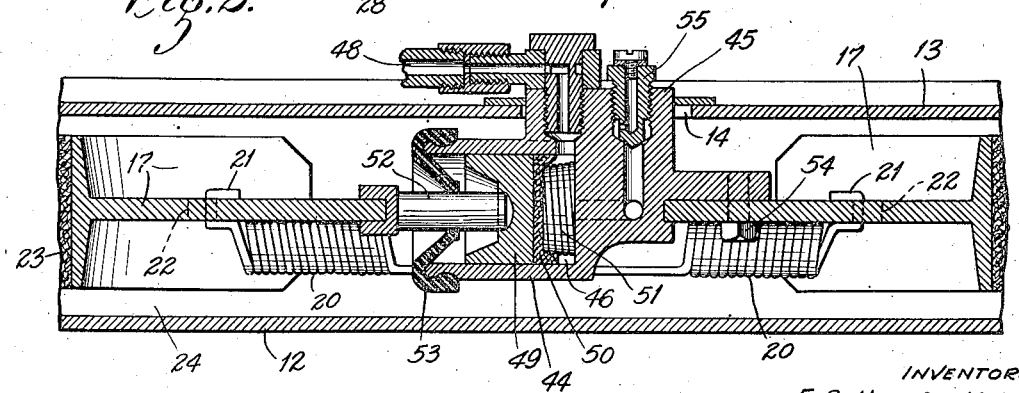
Fig. 2 is a horizontal sectional view taken approximately on the line 2—2 of Figure 1.

In carrying out the invention, two anchor blocks 15, diametrically opposite each other, are fastened by screw elements 16 to the plate 13, and are located between two rigid approximately semi-circular brake shoes 17, as shown in Fig. 1. The brake shoes 17 are slidably secured to the plate 13 by means of stud bolts 18 extending through elongated guide slots 19 in the shoes 17. Contractile spring devices 20 are detachably fastened by means of hooks 21 in openings 22 of the shoes 17. The shoes 17 are provided with linings 23 adapted to frictionally engage an interior annular wall 24 of the drum 12. The contractile spring devices 20 tend to withdraw the linings from engagement with the annular wall 24 of the drum 12.

The anchor blocks 15 are hollow, as shown in Figs. 6 and 7, and have slide members 25 located therein. The slide members 25 are movable relative to each other and to the anchor blocks 15. From one end of each slide member, a ring 26 projects, which fits into a bifurcation 27 of extensions 28 of the brake shoes 17. The rings 26 and extensions 28 are pivotally connected together by means of removable anchor pins 29 extending through the openings in said rings 26 and extensions 28. The openings in the rings 26 are larger than the pins 29, as shown in Fig. 8, say to the extent of .008 of an inch over the diameter of the pins. The space between bifurcations 27 is sufficient to provide clearance on opposite sides of rings 26, as shown in Fig. 6. In practice there is approximately .031 of an inch clearance, so that when the brakes are applied the bifurcations 27 preferably will not touch either side of the rings 26. The adjusting anchor pins 29 contact with these rings 26, after the brake shoes 17 have moved, for example, more than .008 of an inch to take up the wear of the brake lining.

In the hollow anchor blocks 15, the inner front wall is provided with oppositely inclined or cam surfaces 30 and coacting therewith are inclined surfaces 31, at opposite angles to each other, on the slide members 25. Between and fitting each inclined surface 30 and 31 are take-up wedges 32 whose apices are cut away as at 33.

The engaging surfaces of the slide members 25 are cut away at 34 so as to house a contractile coil spring 35 fastened at opposite ends, as shown in Figs. 8 and 9, to the different slide members 25 adjacent the rings 26, so as to slidably urge the members 25 in different directions. The engaging surfaces of the take-up wedges 32 and the surfaces 31 of the slide members are cut away as at 36 to house contractile coil springs 37, tending to urge the smaller or cut away ends 33 of the take-up wedges 32 toward the adjacent end of the slide member with which it is connected. Pins 38, each of which has a hook, may be driven into suitable openings in the slide members 25 to form the anchors for the opposite ends of the contractile coil spring 35, and small pins 39 form the anchors for the ends of springs 37, at the larger end of the slide member whose other ends are suitable fastened in any suitable manner by other pins, also designated 39, to the larger ends of the take-up wedges 32. The spring 35 connects the adjacent slide members 25 and tends to pull said slide members in opposite directions. The action of this connecting spring maintains a firm contact at the inclined surfaces 30 and 31, so as to firmly seat the oppositely disposed wedge members 32 between the slide members 25 and the anchor block 15. The tension of said connecting spring 35 is great enough to prevent accidental displacement of the wedge members 32 and slide members 25, and it yieldingly retains these adjustable elements in the positions to which they are adjusted by the brake shoes. These slide members and take-up wedges move forward only when the brake shoes move in excess of .008 of an inch, due to wear of the brake lining.

40 designates horizontal openings in the slide members 25, take-up wedges 32, and the anchor blocks 15. Slightly bent fraction pins 56 are located in the opening 40 in the slide members 25 and take-up wedges to temporarily hold the take-up wedges in place when setting up the brakes after relining the brake shoes 17. Said pins are pushed back into the slide members 25 before putting the brake into service, as shown in Fig. 6.

In order to prevent the entrance of dust into the spaces of the anchor blocks 15, dust covers 41 are provided, consisting of contractile metallic plates having end portions 42 and plates 43 carried by the brake shoes. Sponge, or other rubber parts, 57 may be located between the end portions 42 and anchor block 15. These parts may be of any desired construction in order to prevent the entrance of dust, and are removable.

Any suitable type of hydraulic actuating device may be used to operate the shoes 17. By way of example, a floating cylinder 44 is associated with each brake shoe, having an enlargement 45 extending slidably through an elongated aperture 14 in the wall of the brake support plate 13. Each cylinder 44 has a chamber 46 adapted to communicate with a suitable fluid-actuating device through the medium of a conduit 47 and a hose 48 which connects the two cylinders in series. In said chambers 46, conventional pistons 49 are operable. Flexible cups 50 engage the inner end of the piston 49 and the cylindrical wall of the chamber 46 and expansive coil springs 51 abut said cups 50 and the base wall of the chambers. Rods 52 extend rigidly from the pistons and are connected to one end of the adjacent brake shoe 17. Said rods 52 extend through suitable openings in flexible closures 53 on the cylinders 44, the closures flexing with movement of the rods. The cylinders 44 are rigidly connected to the other end of the brake shoes 17 as at 54. The lowermost cylinder 44 preferably has a conventional bleeder valve 55 connected in the enlargement 45 thereof.

Due to the wedging principle employed, when the brakes are applied, the friction between the brake lining and brake drums creates a force or pressure toward one end of each brake shoe in the direction of wheel rotation, which force is transmitted to the slide members by the pins 29 and connections. Because of this force, the surfaces 31 force the take-up wedges 32 against the surfaces 30, which locks or wedges them firmly in place. When the brakes are applied, the slide members 25 and the take-up wedges 32 can move forward only, after the adjusting anchor pins 29 move, say, to the extent of .008 of an inch to take up for wear of the brake lining.

To prevent scoring of the brake drums, the effective length of travel of the take-up wedges are controlled by beveling or cutting off the smaller ends of the take-up wedges 32 as previously suggested at 33. In practice, when the take-up wedges are drawn back to their limit, they may be three-eighths of an inch from the large end of their respective slide member, and when the brake lining its nearly worn out, such wedge will have traveled three-eighths of an inch, and it has then reached the end of the surface 31, corresponding to the larger end of the slide member in question, and thus the adjusting movement will stop.

In considering the action of the automatic take-up devices, one should bear in mind that these devices are adapted to maintain a predetermined clearance between the brake lining and the brake drum until the lining is so thin that it should be renewed. Furthermore, when the brake lining is worn to this extent, the automatic adjustment is terminated, and any additional wearing away of the lining will increase the clearance between said lining and the brake drum, which requires a gradual increase in the length of the strokes of the fluid actuated pistons. The operator is then required to increase the length of the stroke of the pedal which displaces the fluid in applying the brakes, and such increase in the movement of the pedal warns the operator of the thin condition of the brake lining.

To more fully point out the manner in which these results are accomplished, we will now refer to the action of only one of the take-up devices, with the understanding that each end of each brake shoe is connected to one of these devices, and that the several take-up devices are movable in response to excess movements of the brake shoes. For the purpose of this more detailed explanation, we will select the upper take-up device shown in Figures 6 to 11, inclusive.

This take-up device lies between the inner side faces of an anchor block 15, as shown in Figure 6, and it will be observed that said inner side faces of the anchor block are parallel with each other, with the exception of inclined cam surfaces 30 extending from one side face of the anchor block. The elements movable along said inner faces of the anchor block include a slide member 25 provided with an eye or ring 26 which is loosely connected to one end of a brake shoe through the medium of an anchor pin 29. If the clearance at said pin is .008 of an inch, the brake shoe can move a corresponding distance without imparting any movement to the slide member 25, and this fraction of an inch may be regarded as a predetermined clearance between the brake lining and the brake drum. Therefore, the brake shoe is permitted to move a predetermined distance without imparting any motion to the take-up device.

However, when this motion is exceeded as a result of any degree of wear on the brake lining, such excess motion will be transmitted to the ring 26 on the slide member 25, thereby advancing the slide member a distance corresponding to the reduction in thickness of the brake lining. We are now referring to the upper slide member 25 in Figs. 6 to 11, inclusive, which advances to the right from the starting position shown in Figs. 6 to 10. The object is to permit such advance in response to any excess movement of the brake shoe, and to then prevent return of the slide member.

This slide member 25 is movable in a straight line along the parallel inner faces of the anchor block 15, but it is yieldingly connected to a take-up wedge 32 through the medium of a spring 37 (Figure 9) so the wedge will follow the slide member 25. However, the wedge will travel along the inclined surfaces 30 and 31, which lie at an angle to the path of the slide member 25, and owing to the constant tension of the connecting spring 37, said wedge will remain in firm contact with said inclined surfaces, and thereby prevent return movement of the slide member 25. In other words, the take-up wedge 32 permits the slide member 25 to advance in response to the excess movement required for any wearing away of the brake lining, and said wedge serves as an abutment to prevent return of the slide member, thereby retaining the predetermined clearance between the brake lining and the brake drum.

Consequently, the take-up devices immediately compensate for any slight degree of wear on the brake lining. The length of the strokes of the hydraulic operating devices are substantially uniform during the normal life of the brake lining, and the pedal stroke required to displace the operating fluid is correspondingly uniform.

We will now refer to a condition existing when the brake lining becomes so thin that it should be renewed. At this time, the wedge 32 will lie to the right from the position shown in Figure 6, and its flat face 33 will lie beyond the incline 30 on the anchor block 15, so as to discontinue the automatic take-up function of the wedge. At this time, the wedge will serve as a stop to limit the return movements of the slide member 25, but it is free to advance and return a limited distance with said slide member, so it does not compensate for additional wear on the brake lining. In response to such additional wear, the slide member 25 moves an excess distance to the right in Figure 6, and the wedge partakes of this excess stroke, but upon the return stroke, the wedge moves back a distance equal to the excess motion before it is tightened between the inclined faces 30 and 31.

Therefore, when the brake lining is so thin that it should be renewed, longer strokes will be required at the hydraulic operating devices, and since this will require a gradual increase in the length of the stroke at the pedal which displaces the operating fluid, the operator will be warned of the condition of the brakes in ample time to have them relined and thus the scoring of brake drums automatically prevented.

Since the openings in the rings 26 on the slide members 25 through which the pins 29 pass are for instance .008 of an inch larger than the pins, they regulate the distance the brake shoes retard from the brake drums when hydraulic pressure is released. This gives proper clearance between the lining and brake drums. Said pins 29 also have for instance .004 of an inch clearance in the anchor blocks 15 for free movement of the brake shoes when the brakes are applied or released. The two automatic adjusting anchor blocks are set so that the greater part of the clearance of the anchor pins 29 in the automatic adjusting anchor blocks, about .003 of an inch, is on the lower side of the two upper adjusting anchor pins 29 and the upper side of the two lower adjusting pins 29, leaving about .001 of an inch clearance on the upper side of the two upper adjusting anchor pins 29 and the lower side of the two lower adjusting anchor pins 29 in the two automatic adjusting anchor blocks.

When hydraulic pressure is applied to the brake shoes 17, the friction between lining and drum carries the brake shoes in the direction of wheel rotation. Therefore, the adjusting anchor pins 29 on each brake shoe farthest advanced in the direction of rotation holds the brake shoes and acts as an anchor and pivot, leaving the adjusting anchor pins 29 at the opposite end of each brake shoe free for self-energization or vice versa when wheel rotation is reversed.

When hydraulic pressure is applied to the cylinders 44, both brake shoes 17 are actuated at each end, creating pressure at four points on the brake shoes in the brake drum, thereby energizing each brake shoe individually at each end and centralizing them automatically. Each brake shoe also utilizes the momentum of the automobile to energize itself in the direction of wheel rotation, giving maximum braking power both forward and backward. This double action of the brake shoes is possible through the medium of the automatic adjusting device.

It will now be understood that the two pairs of anchoring pivots 29 are located at the ends of the brake shoes, and that the two sets of hydraulic operating devices lie adjacent to said pivots, but more remote from the ends of the brake shoes. Furthermore, owing to the action of the automatic take-up devices, the clearance at the floating pivots 29 normally limits the movements of the brake shoes to the desired predetermined strokes, for example, .008 of an inch. As a result of these conditions, including the locations of the pivots 29 at the ends of the brake shoes, and the locations of the two sets of hydraulic thrust devices in lines approximately between the pairs of pivots, there is no substantial objection to any pivotal motion that may occur at the anchoring pivots. Such pivotal motion is very slight, and it is partly compensated by the predetermined clearance at the pins 29 which lie at the ends of the shoes, where they will not form an objectionable fulcrum that would tend to displace one end of a shoe from the brake drum. This combination of conditions produces a brake wherein the braking thrusts are well distributed over the surfaces of the brake shoes, and it eliminates the objections heretofore resulting from excess movements of the shoes, or unequal pressures due to objectionable pivotal movements, or to thrusts at only two points on the shoes. Moreover, the floating anchoring devices and the automatic take-up devices associated therewith, will adjust themselves to the various different operating conditions, so as to permit efficient operation of the brakes at all times, and when the brakes should be relined, the operator is immediately advised of this condition by the action of the take-up devices which then discontinue the adjustment of the anchoring devices.

To set up the automatic adjusting device, the small slightly bent friction pin 56 is inserted in the hole 40 running through the large end of the take-up wedges and the small end of the slide members which serves to hold the take-up wedge in place when setting up the brakes after relining the brake shoes. Such small, slightly bent friction pin is pushed back in the large slide member in any suitable manner, such as by inserting a blunt pin through a hole 40 in the automatic adjusting anchor block 25 after setting up operation. To release the take-up wedge, the large slide member must be pushed back to full extent before it can be released. A screw 58, as shown in Fig. 1, may be fastened in each of the holes 40 in the automatic adjusting anchor blocks after the small, slightly bent friction pins are pushed back into place.

Having thus described our invention, it is obvious that various changes may be resorted to, without departing from the spirit and scope of the invention; hence we do not wish to be limited to the exact form, construction, arrangement and combination of parts herein shown and described, or uses mentioned.

We claim:

1. A brake provided with shoes, means operable to apply said shoes, anchor means having pins, said shoes being connected to said pins, oppositely movable slide members connected to said pins having oppositely disposed cam surfaces, said anchor means having oppositely disposed cam surfaces, wedge members between the cam surfaces of the anchor means and slide members, and means urging sliding movement of said wedge members in opposite directions.

2. A brake provided with shoes, means operable to apply said shoes, anchor means having pins, said shoes being connected to said pins, oppositely movable slide members connected to said pins having oppositely disposed cam surfaces, said anchor means having oppositely disposed cam surfaces, wedge members between the cam surfaces of the anchor means and slide members and means urging sliding movement of said wedge members in opposite directions comprising springs connected to the slides and to the larger ends of the wedges.

3. A brake provided with shoes, means operable to apply said shoes, anchor means having pins, said shoes being connected to said pins, oppositely movable slide members connected to said pins having oppositely disposed cam surfaces, said anchor means having oppositely disposed cam surfaces, wedge members between the cam surfaces of the anchor means and slide members, means urging sliding movement of said wedge members in opposite directions, linings on said shoes, said wedges being cut away at their smaller ends to limit the effective adjustment of said wedges.

4. A brake provided with shoes, means operable to apply said shoes, anchor means having pins, said shoes being connected to said pins, oppositely movable slide members connected to said pins having oppositely disposed cam surfaces, said anchor means having oppositely disposed cam surfaces, wedge members between the cam surfaces of the anchor means and slide members, means urging sliding movement of said wedge members in opposite directions comprising springs connected to the slides and to the larger ends of the wedges, and a spring connected to said slide members urging them in opposite directions.

5. A brake provided with shoes, means operable to apply said shoes, anchor means having pins, said shoes being connected to said pins, oppositely movable slide members connected to said pins having oppositely disposed cam surfaces, said anchor means having oppositely disposed cam surfaces, wedge members between the cam surfaces of the anchor means and slide members, means urging sliding movement of said wedge members in opposite directions comprising springs connected to the slides and to the larger ends of the wedges, a spring connected to said slide members urging them in opposite directions, the means urging application of the shoes being hydraulic, and contractile spring means urging retraction of the shoes.

6. A brake provided with a pair of brake shoes, means operable to apply said shoes, two slide members connected to each brake shoe, cam means oppositely disposed and coacting with the respective slide members, the means for applying the brake shoes being hydraulic, and means urging retraction of the brake shoes.

7. A brake provided with a pair of oppositely disposed approximately semi-circular brake shoes, a brake drum surrounding said shoes, operating means between said shoes, anchoring means comprising a pair of adjustable anchors loosely connected to end portions of said brake shoes, the looseness in the anchor connections being approximately equal to the normal braking movements of the brake shoes so as to permit operation of the brakes without displacing said anchors, the latter being movable with the brake shoes in response to excess movement due to abrasion at the braking surfaces, and take-up devices preventing retrograde movement of said anchors.

8. A brake provided with a pair of oppositely disposed approximately semi-circular brake shoes, a brake drum, surrounding said shoes, operating means between said shoes, anchoring means comprising a pair of adjustable anchors loosely connected to end portions of said brake shoes, the looseness in the anchor connections being approximately equal to the normal braking movements of the brake shoes so as to permit operation of the brakes without displacing said anchors, the latter being movable with the brake shoes in response to excess movement due to abrasion at the braking surfaces, and take-up devices preventing retrograde movement of said anchors, each of said take-up devices including an adjustable stop member movable with one of said anchors and a cam cooperating with said adjustable stop member to prevent said retrograde movement.

9. A brake provided with a pair of oppositely disposed approximately semi-circular brake shoes, a brake drum surrounding said shoes, operating means between said shoes, anchoring means comprising a pair of adjustable anchors loosely connected to end portions of said brake shoes, the looseness in the anchor connections being approximately equal to the normal braking movements of the brake shoes so as to permit operation of the brakes without displacing said anchors, the latter being movable with the brake shoes in response to excess movement due to abrasion at the braking surfaces, and take-up devices preventing retrograde movement of said anchors, each of said take-up devices including a cam having an abutment face, and an adjustable wedge carried by one of said anchors and movable along said abutment face to prevent said retrograde movement.

10. A hydraulic brake provided with a pair of oppositely disposed approximately semi-circular brake shoes, a brake drum surrounding said shoes, anchoring means comprising a pair of adjustable pivots loosely connected to end portions of said brake shoes, the looseness in the pivotal connections being approximately equal to the normal braking movements of the brake shoes so as to permit operation of the brakes without displacing said anchors, the latter being movable with the brake shoes in response to excess movement due to abrasion at the braking surfaces, take-up devices preventing retrograde movement of said pivotal connections, and hydraulic operating means comprising a piston and cylinder located between said brake shoes to displace the pivotal connections in response to said excess movement, said piston and cylinder being adjacent to said pivotal connections but more remote from the ends of the brake shoes.

11. A hydraulic brake provided with a pair of oppositely disposed approximately semi-circular brake shoes, a brake drum surrounding said shoes, hydraulic operating means between said shoes, anchoring means comprising a pair of floating anchors having eyes and pivot pins loosely connecting said eyes to end portions of said brake shoes, the looseness being approximately equal to the normal braking movements of the brake shoes, so as to permit operation of the brakes without displacing said anchors, the latter being movable with the brake shoes in response to excess movement due to abrasion at the braking surfaces, and take-up devices preventing retrograde movement of said anchoring means, each of said take-up devices including a wedge following one of the floating anchors to prevent return movement thereof.

12. A brake provided with a pair of oppositely disposed approximately semi-circular brake shoes, a brake drum surrounding said shoes, operating means between said shoes, anchoring means comprising a pair of adjustable anchors loosely connected to end portions of said brake shoes, the looseness in the anchor connections being approximately equal to the normal braking movements of the brake shoes so as to permit operation of the brakes without displacing said anchors, the latter being movable with the brake shoes in response to excess movement due to abrasion at the braking surfaces, and take-up devices preventing retrograde movement of said anchors, each of said take-up devices including an adjustable stop member movable with one of said anchors, and means for limiting the adjustment of said stop member to permit retrograde movement of the anchor after the stop member has advanced a predetermined distance.

13. A brake provided with a pair of oppositely disposed approximately semi-circular brake shoes, a brake drum surrounding said shoes, operating means between said shoes, anchoring means comprising a pair of adjustable anchors loosely connected to end portions of said brake shoes, the looseness in the anchor connections being approximately equal to the normal braking movements of the brake shoes so as to permit operation of the brakes without displacing said anchors, the latter being movable with the brake shoes in response to excess movement due to abrasion at the braking surfaces, and take-up devices preventing retrograde movement of said anchors, each of said take-up devices including an adjustable stop member movable with one of said anchors, and means for limiting the adjustment of said stop member to permit retrograde movement of the anchor after the stop member has advanced a predetermined distance, the last mentioned means including a cam having an abutment face normally engaged by said stop member, the latter being movable along said abutment face during the initial excess movements of the anchor and movable away from said abutment face in response to the final excess movements.

14. A brake provided with a pair of oppositely disposed approximately semi-circular brake shoes, a brake drum surrounding said shoes, operating means between said shoes, anchoring means comprising a pair of adjustable anchors loosely connected to end portions of said brake shoes, the looseness in the anchor connections being approximately equal to the normal braking movements of the brake shoes so as to permit operation of the brakes without displacing said anchors, the latter being movable with the brake shoes in response to excess movement due to abrasion at the braking surfaces, and take-up devices preventing retrograde movement of said anchors, each of said take-up devices including an adjustable wedge movable with one of said anchors, and means for limiting the adjustment of said wedge to permit retrograde movement of the anchor after the wedge has advanced a predetermined distance.

15. A hydraulic brake provided with a pair of oppositely disposed brake shoes, a brake drum surrounding said brake shoes, anchoring means comprising two pairs of adjustable anchors loosely connected to end portions of the brake shoes to permit movement of said brake shoes independently of said anchors, the looseness at the anchor connections being approximately equal to the normal braking movements of the brake shoes so as to permit normal operation of the brakes without displacing said anchors, said anchors being movable with the brake shoes in response to excess movement due to abrasion at the braking surfaces, take-up devices preventing retrograde movement of said anchors, and two sets of hydraulic operating devices between the brake shoes to force them toward the brake drum, each of said hydraulic operating devices being near a pair of said anchors so as to force each end of each brake shoe toward the brake drum, and said hydraulic devices being approximately between the pairs of anchors, so as to impart the braking thrusts at four points adjacent to the anchors but more remote from the ends of the brake shoes.

16. A hydraulic brake provided with a pair of oppositely disposed brake shoes, a brake drum surrounding said brake shoes, anchoring means comprising two pairs of adjustable anchors loosely pivoted to end portions of the brake shoes to permit movement of said brake shoes independently of said anchors, the looseness at the pivotal connections being approximately equal to the normal braking movements of the brake shoes so as to permit normal operation of the brakes without displacing said anchors, said anchors being movable with the brake shoes in response to excess movement due to abrasion at the braking surfaces, take-up devices preventing retrograde movement of said anchors so as to maintain said looseness at the pivotal connections, and hydraulic operating means comprising two sets of pistons and cylinders interposed between the brake shoes to force them toward the brake drum, each piston and cylinder being near a pair of said pivotal connections but more remote from the ends of the brake shoes so as to impart the braking thrusts in lines between the pairs of pivotal connections.

17. A hydraulic brake provided with a pair of oppositely disposed brake shoes, a brake drum surrounding said brake shoes, anchoring means comprising two pairs of adjustable anchors loosely pivoted to end portions of the brake shoes to permit movement of said brake shoes independently of said anchors, the looseness at the pivotal connections being approximately equal to the normal braking movements of the brake shoes so as to permit normal operation of the brakes without displacing said anchors, said anchors being movable with the brake shoes in response to excess movement due to abrasion at the braking surfaces, take-up devices preventing retrograde movement of said anchors, and hydraulic operating means comprising two sets of pistons and cylinders interposed between the brake shoes to force them toward the brake drum, each piston and cylinder being near a pair of the pivotal connections so as to force each end of each brake shoe toward the brake drum, and said pistons and cylinders being approximately between the pairs of pivotal connections so as to impart the braking thrusts at four points adjacent to the pivots but more remote from the ends of the brake shoes.

FREDERICK A. HIRSCHMAN.
HARRY J. HIRSCHMAN.